United States Patent [19]
Pommerening

[11] 3,742,197
[45] June 26, 1973

[54] SYNTHESIS OF DIGITAL SIGNALS CORRESPONDING TO SELECTED ANALOG SIGNALS

[75] Inventor: Uwe A. Pommerening, Webster, N.Y.

[73] Assignee: Stomberg-Carlson Corporation, Rochester, N.Y.

[22] Filed: Jan. 14, 1972

[21] Appl. No.: 217,988

Related U.S. Application Data

[63] Continuation of Ser. No. 4, Jan. 2, 1970, abandoned.

[52] U.S. Cl. ................ 235/152, 235/197, 325/38 B
[51] Int. Cl. ................ B06f 7/38
[58] Field of Search ................ 235/152, 197; 328/14; 332/11; 325/38 B

[56] References Cited

UNITED STATES PATENTS

| | | | |
|---|---|---|---|
| 3,273,141 | 9/1966 | Hackett | 340/347 |
| 3,296,612 | 1/1967 | Tomozawa | 325/38 BX |
| 3,636,337 | 1/1972 | Dietal | 235/152 X |

*Primary Examiner*—Malcolm A. Morrison
*Assistant Examiner*—David H. Malzahn
*Attorney*—Hoffman Stone and Charles C. Krawczyk et al.

[57] ABSTRACT

Digital signals for use in a time-divided multiplex signalling system are synthesized directly in digital form. Binary signals indicative of the differences between the values of successive time-spaced samples of preselected analog signals are fed through gates to an up-and-down accumulator under control of a counter and phase and polarity discriminators. The output of the accumulator at any instant represents the algebraic sum of all previous signals received by it. The preselected analog signals are preferably of the kind that can be represented by the sums of one or more simple trigonometric functions, so the sample values need be calculated only for a quarter wave.

8 Claims, 8 Drawing Figures

INVENTOR.
UWE A. POMMERENING

BY [signature]

ATTORNEY

*INVENTOR.*
UWE A. POMMERENING

INVENTOR.
UWE A. POMMERENING

INVENTOR.
UWE A. POMMERENING

INVENTOR.
UWE A. POMMERENING

INVENTOR.
UWE A. POMMERENING

INVENTOR.
UWE A. POMMERENING

INVENTOR.
UWE A. POMMERENING

SYNTHESIS OF DIGITAL SIGNALS CORRESPONDING TO SELECTED ANALOG SIGNALS

This is a continuation of copending application Ser. No. 4, filed Jan. 2, 1970, and now abandoned.

BRIEF DESCRIPTION

This invention relates to time division multiplex signalling systems, and more particularly, to the synthesis of electrical signals in binary, or so-called digital form indicative of preselected analog signals without first producing the analog signals and then encoding them.

Time division multiplexing with pulse code modulated signals is coming into extensive use in the telephone industry as a means for increasing the capacity of outside plant at reasonable cost. In a typical system of this type, analog signals to be transmitted are sampled at predetermined intervals, and the samples are encoded into binary form and time division multiplexed.

In telephone systems, transmission of predetermined tone signals is required, such as, for example, dial tone, busy tone, ringback tone, and error tone. In conventional central offices of the analog type, these tones are usually produced by simple oscillators, and switched to the various lines as required. Heretofore, in PCM systems the usual practice has been to generate the tone signals in the old way as analog signals, and then to convert them to digital form.

According to the invention, tone signals of this kind may be generated directly in digital form with a significant increase in efficiency and reliability, and at less cost with regard both to operating expense and equipment requirements.

Briefly, according to the invention, the tone signals are generated by a binary up-and-down accumulator, which is fed a series of signals indicative of the calculated differences between successive time-spaced samples of the simple trigonometric components of the tone signal it is desired to produce. The signals are fed to the accumulator from arrays of gates, which are selectively enabled and inhibited by counters. The counters are preferably driven at the frame rate of the PCM system to simplify synchronization of the synthesizer with the PCM system it serves, and, for convenience, the synthesizer is timed by the basic clock of the PCM system.

In addition, by the use of buffer devices such as registers, the accumulator may be operated on a time-shared basis to produce a large number of different output tone signals, with the instantaneous values of each signal being stored in a separate register during the intervals between additions.

DETAILED DESCRIPTION

Figure 1:
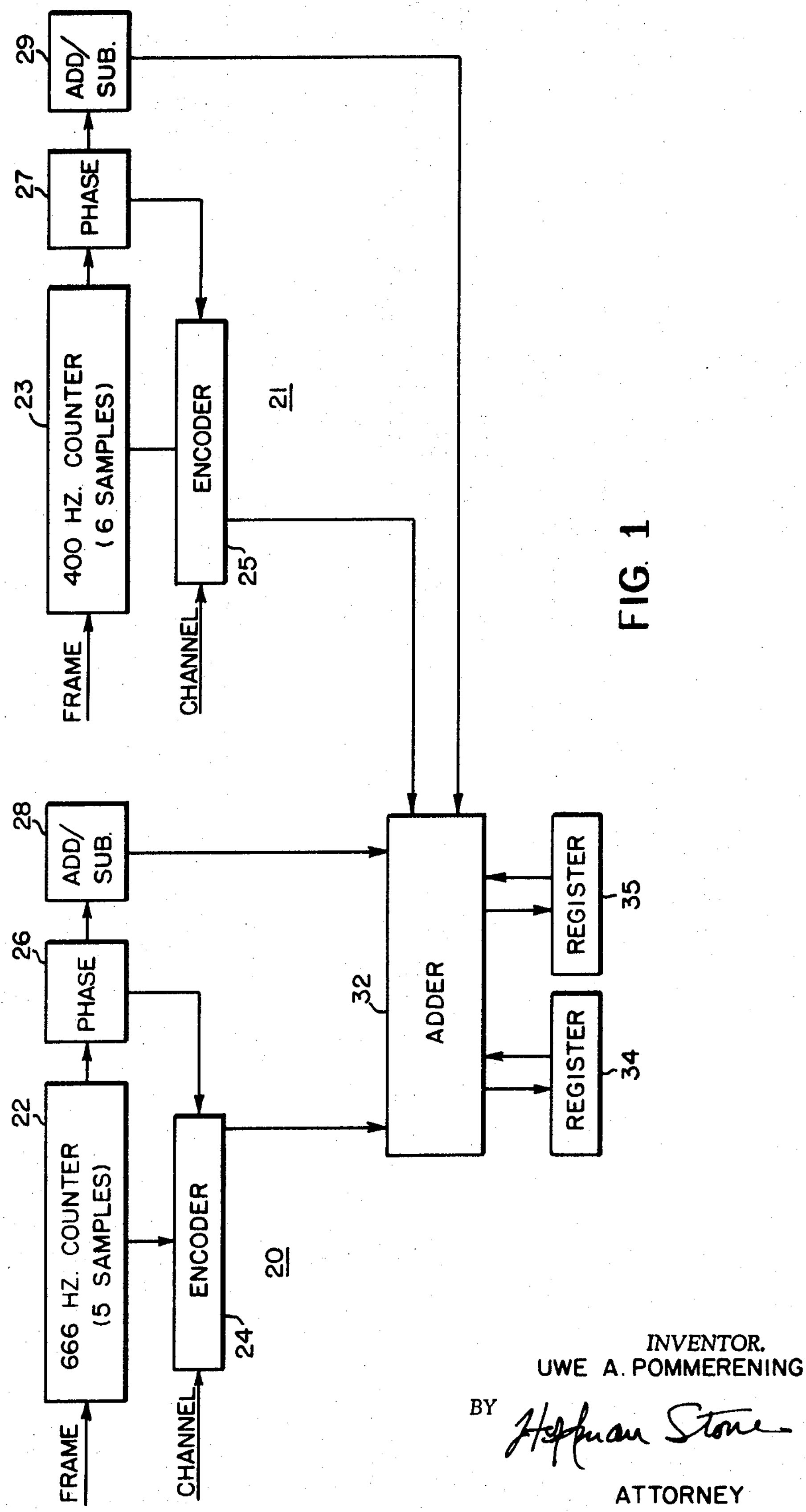
Figure 2A:
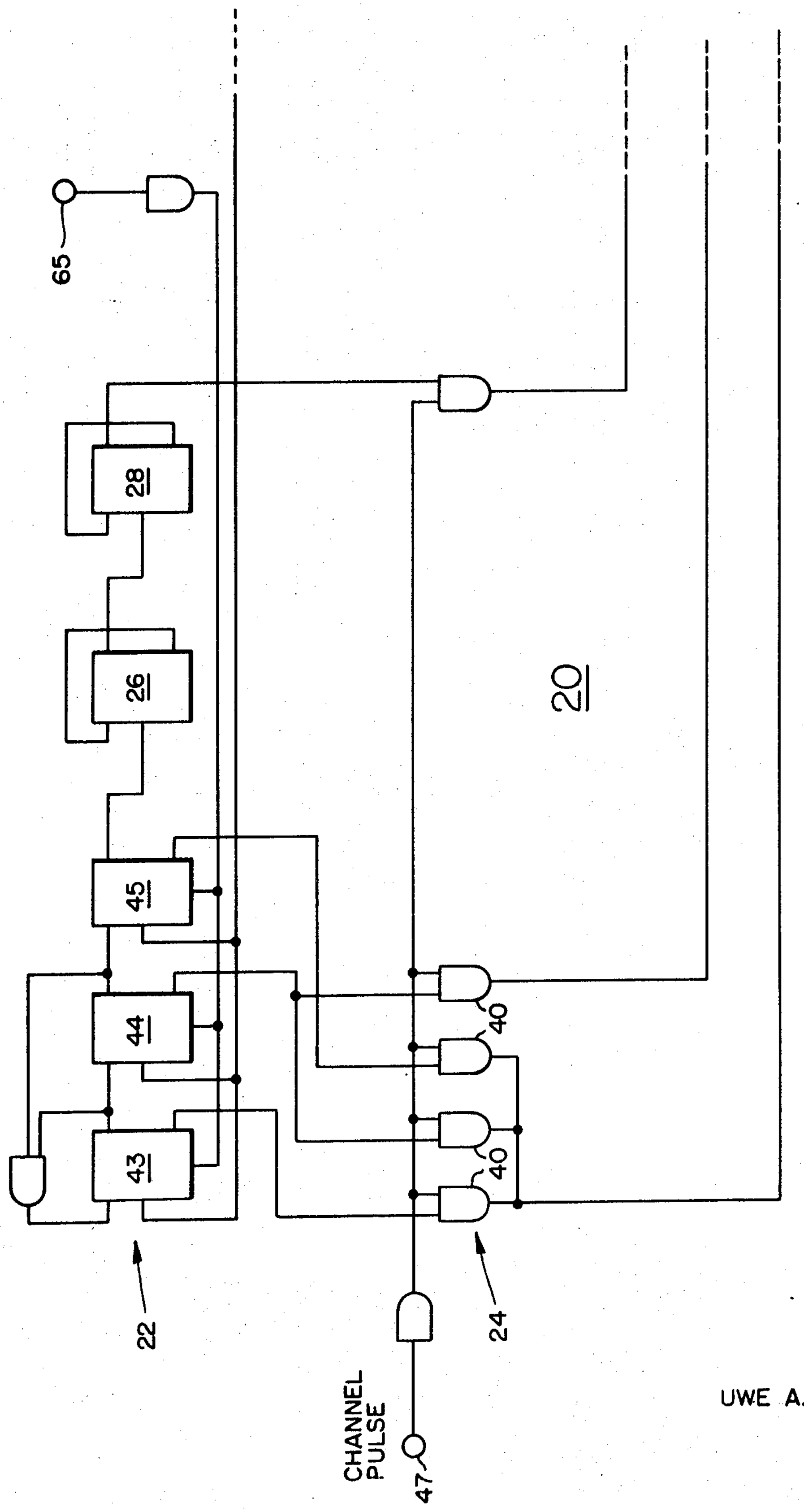
Figure 2B:
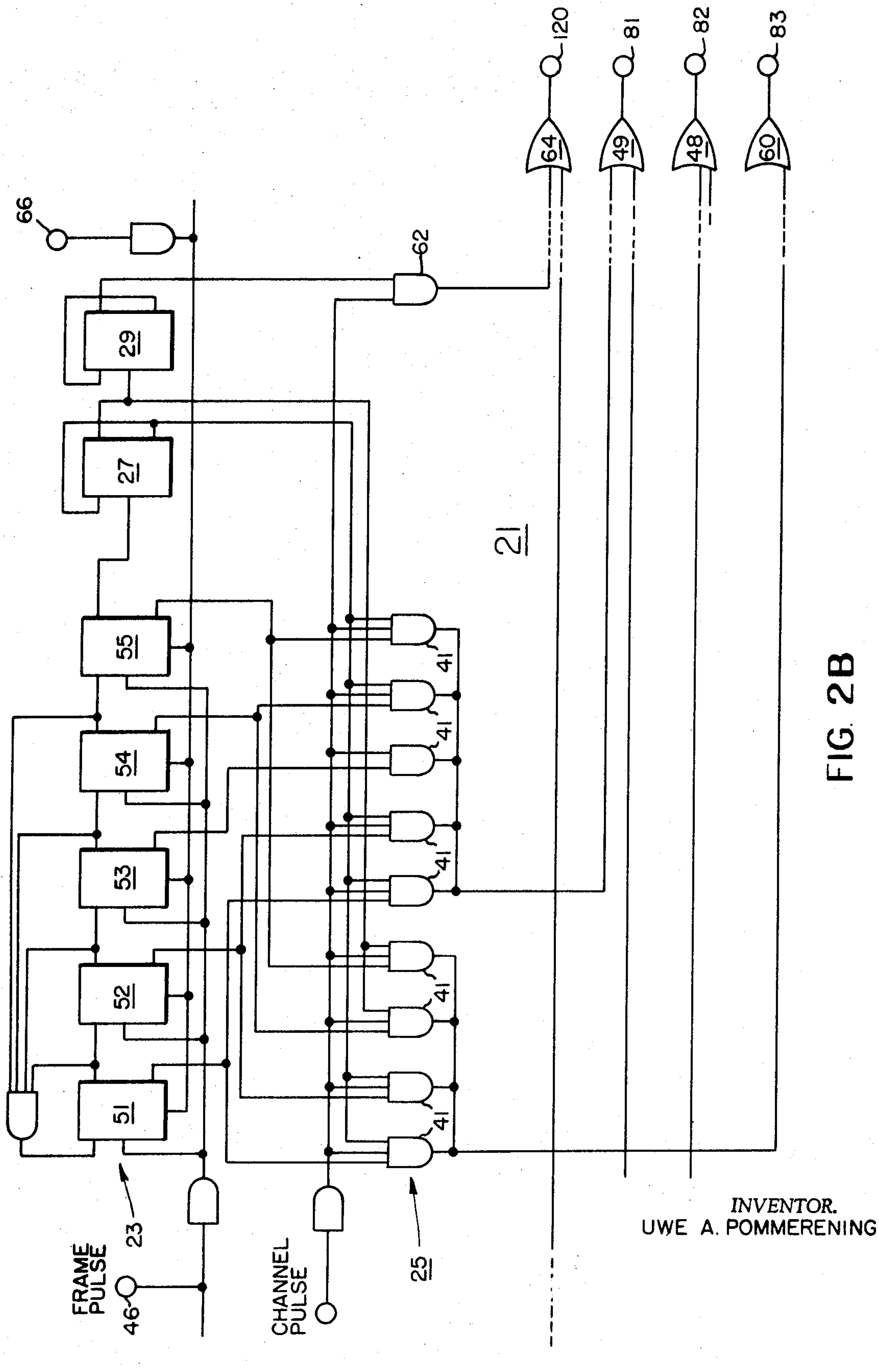
Figure 3A:
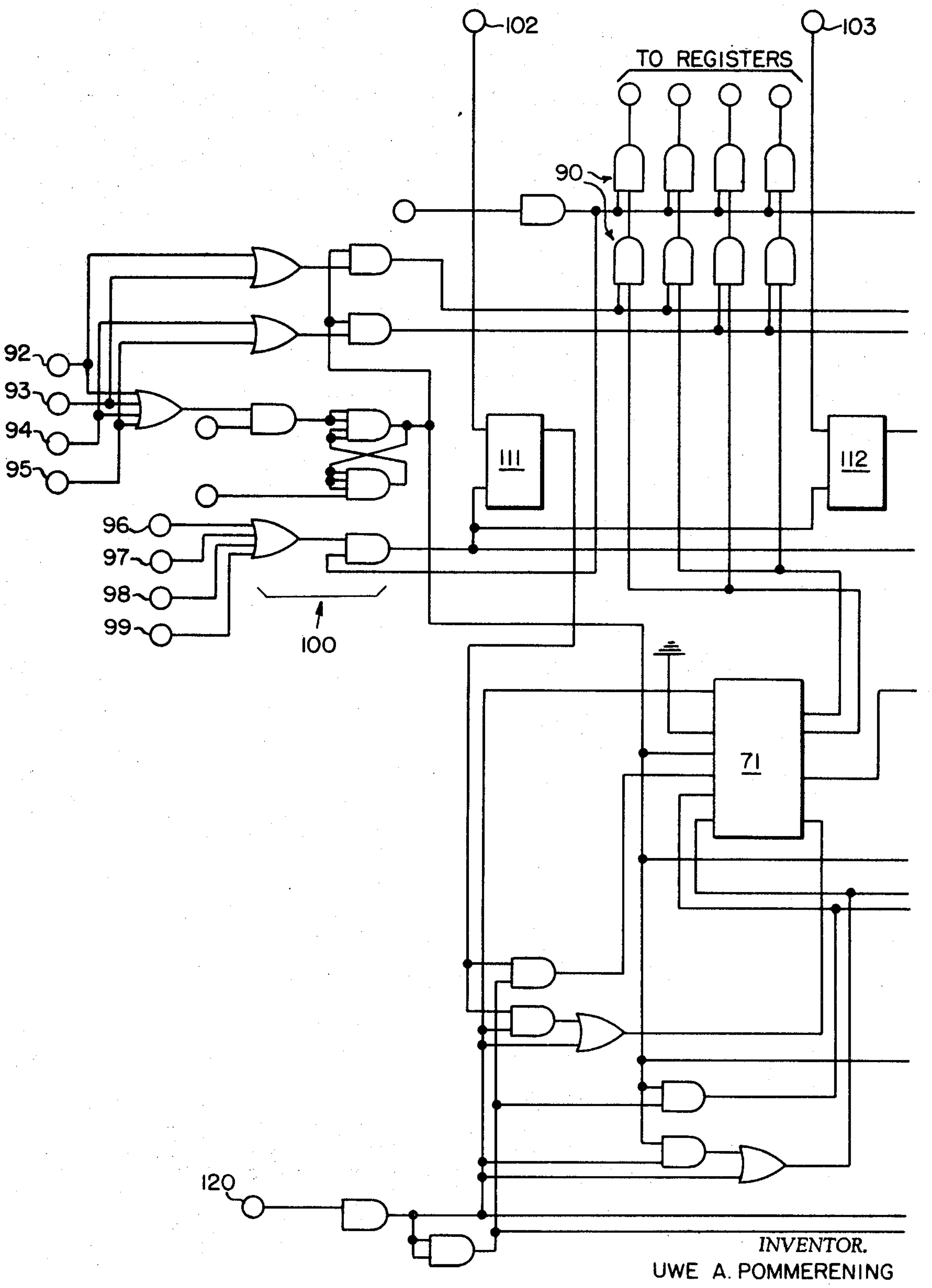
Figure 3B:
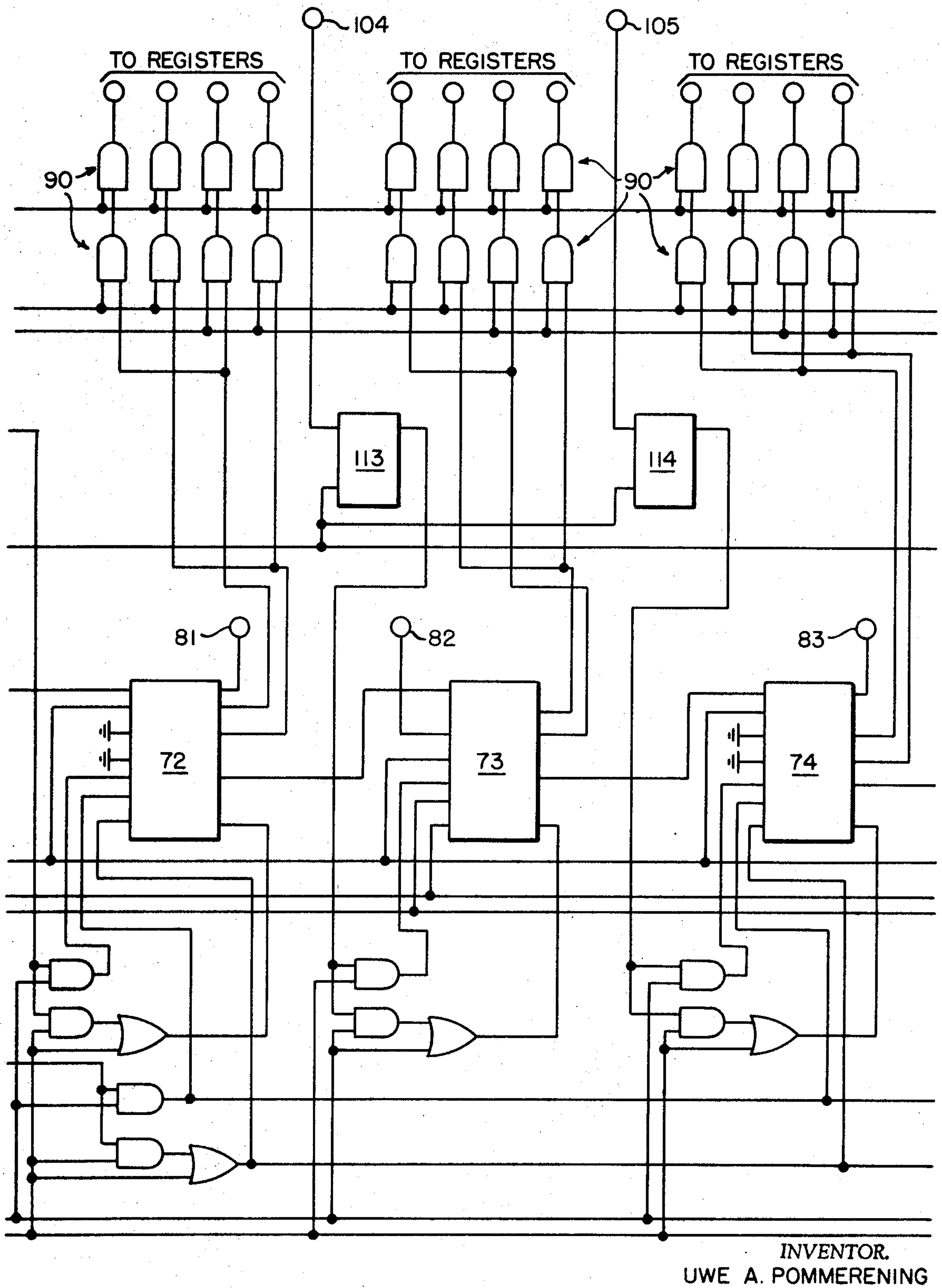
Figure 3C:
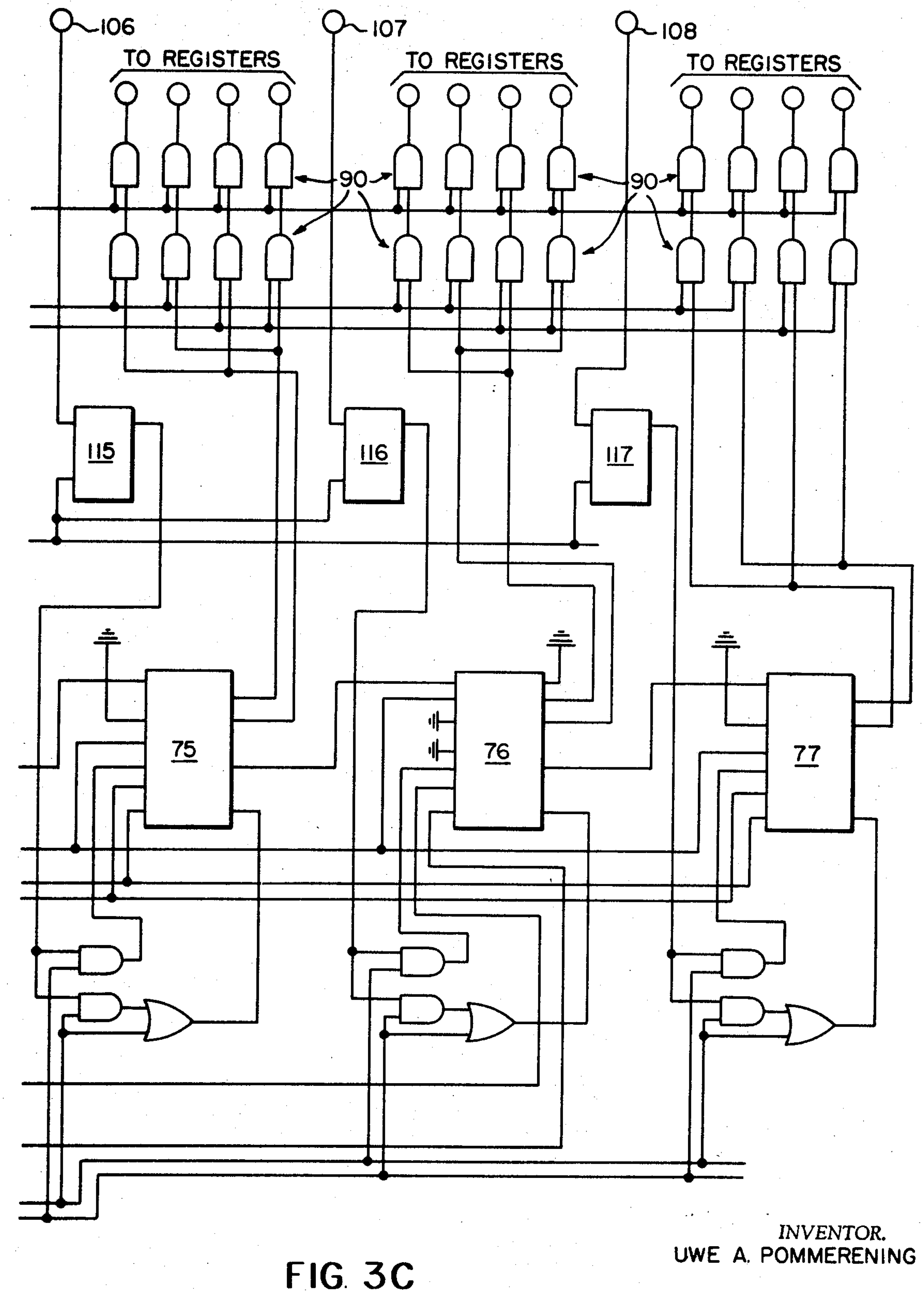
Figure 4A:
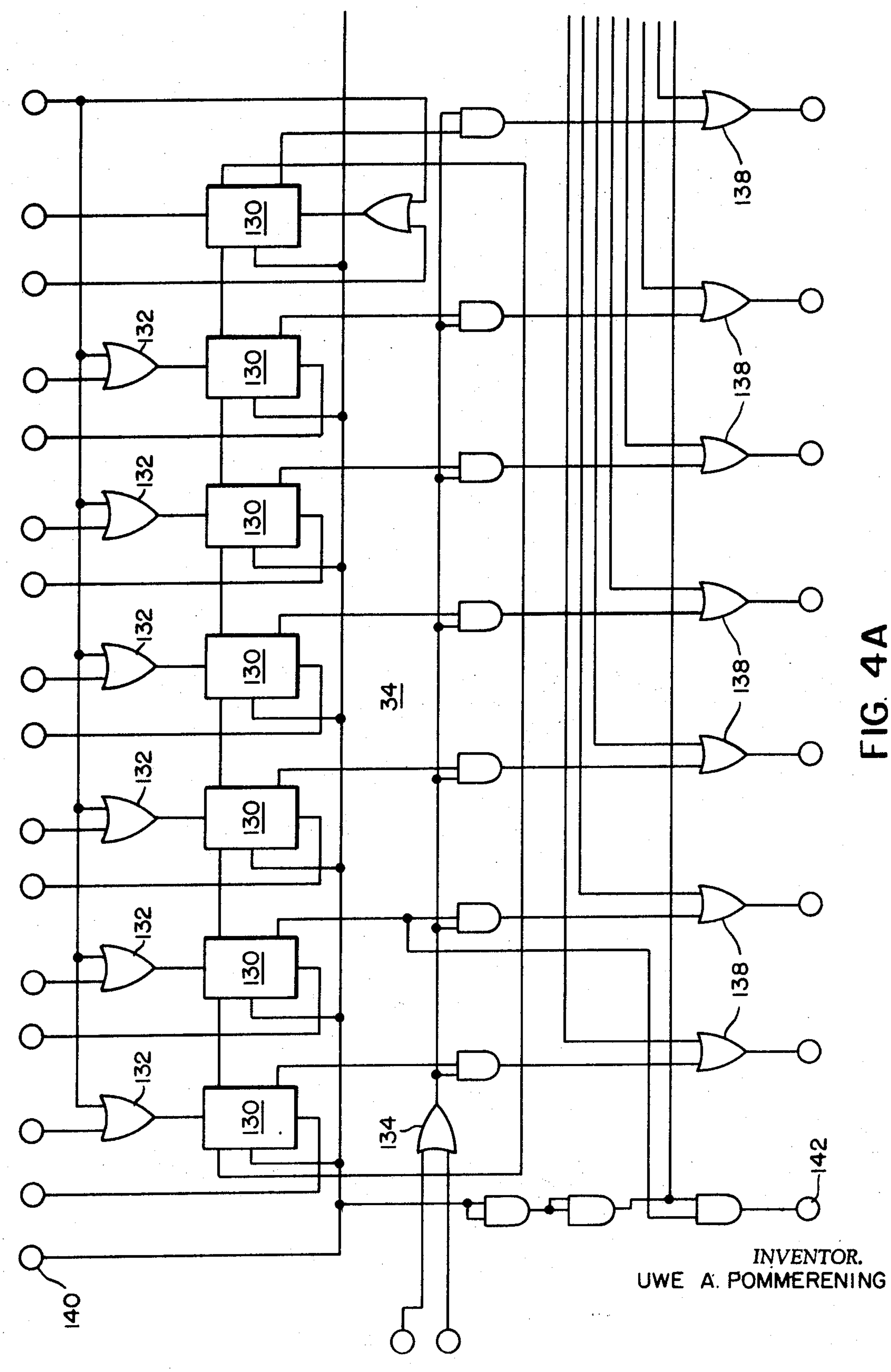
Figure 4B:
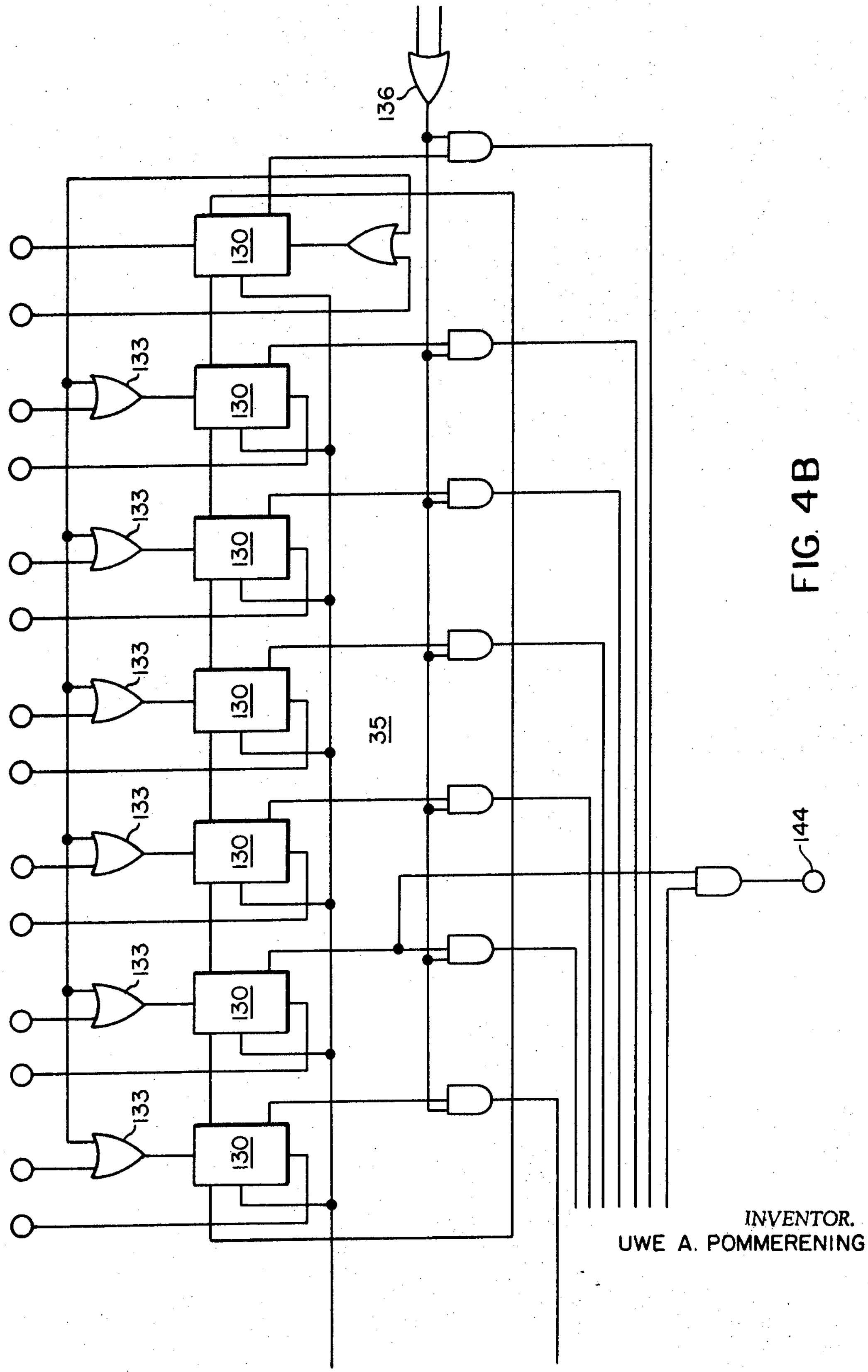

A representative embodiment of the invention will now be described in connection with the accompanying drawings, wherein:

FIG. 1 is a block diagram of a circuit according to the invention arranged to produce a single output signal composed of two simple tone signals, and illustrating the underlying principle of the invention;

FIGS. 2A and 2B, juxtaposed with FIG. 2A on the left, show a detailed circuit diagram of an array of counters and gates for producing the calculated difference signals for two simple tone signals;

FIG. 3A, 3B, and 3C, juxtaposed with FIG. 3A on the left, and FIG. 3C on the right, are a circuit diagram of the seven-bit adder and its associated logic; and FIGS. 4A and 4B, juxtaposed with FIG. 4A on the left, constitute a detailed diagram of two registers and associated input and output circuitry for storing the digital output signals produced by the adder shown in FIGS. 3A, 3B, and 3C, thereby enabling time sharing of the adder.

The basic principle of the invention may perhaps be best understood in connection with the block diagram of FIG. 1. The circuit is arranged to synthesize digital signals corresponding to analog signals of the kind traditionally used in telephone systems, each of which consists of two simple unmodulated notes representable as sine waves. By modifications well within the field of the art, however, the circuit can be arranged to produce digital signals corresponding to any desired analog signal.

As shown, the circuit includes two difference synthesizers, 20 and 21, each of which produces digital signals corresponding approximately to the differences between successive time divided samples of a simple sine wave tone signal. The first synthesizer 20 may, for example, be arranged to produce digital signals corresponding to the difference values for a tone signal of about 666 hz., and the second synthesizer 21 may be arranged to produce signals corresponding to the difference values of a simple tone of about 400 hz.

Each of the difference synthesizers 20 and 21 includes a counter 22 and 23, respectively, which is stepped by the framing pulses of the PCM system at the beginning of each frame. The counters 22 and 23, in conjunction with phase control flip-flops 26 and 27, respectively, set respective encoders 24 and 25 to cause the encoders to deliver the desired difference signals to the accumulator 32 in response to the application of so-called channel pulses to the encoders 24 and 25. The encoders 24 and 25 are simply arrays of gates, as described hereinafter, which are selectively inhibited and partially enabled by the counters 22 and 23 and the flip-flops 26 and 27 to gate the channel pulses to the different input terminals of the accumulator 32 to cause it to add the approximate calculated difference value on each addition.

The term channel pulse as used herein refers to any clock pulse of the PCM system selected for application to any of the encoders 24 and 25. All of the counters 22 and 23 are preferably stepped simultaneously, once during each frame of the PCM system, but the signals from the encoders 24 and 25 must be delivered to the accumulator 32 in time spaced order, only one encoder at a time, and it may be desired to deliver the same signal from an encoder to the accumulator several times during each frame depending upon the particular output signals it is desired to produce. For example, separate output signals may be desired for each of the simple sine wave tones, and one including both. In that case, each of the encoders would receive a channel pulse twice during each frame, four channel pulses being required in all.

The encoders 24 and 25 are arranged to produce, in response to application of the channel pulses, output signals representing to the accumulator 32 the approximate differences between the values of successive time spaced samples of the respective analog signals over an interval of one-half wave duration. At the end of each half wave, an ADD-SUBTRACT flip-flop 28 and 29, respectively, is triggered to reverse the algebraic sign of the accumulator 32, thereby to cause the accumulator 32 to add algebraically, first adding the successive signals for one-half wave, and then subtracting for a half wave of the analog signal.

The sum produced by the accumulator 32 is a digital signal corresponding to the desired analog signal to be synthesized, and may be fed directly to any desired utilization circuit. Preferably, however, the accumulator is time shared among several difference synthesizers, and to produce several different output tone signals, most of which consist of combinations of simple tones. For this purpose, the output of the accumulator 32 is fed selectively to registers 34 and 35 for storage between successive additions, each register being assigned to store a selected output tone.

As shown in FIGS. 2A and 2B, each of the difference synthesizers 20 and 21 includes an array of encoding gates 40 and 41, respectively, operated by respective counters 22 and 23 and phase control flip-flops 26 and 27, respectively. The gates 40 and 41 are driven to produce digital signals indicating the calculated differences in values between successive samples of the sine wave tone signals as if an actual analog sine wave had been sampled and encoded in binary form.

Conveniently, operation is under control of the clock of the PCM system with which the synthesizer operates. The counters 22 and 23 are advanced once during each frame of the PCM system, selectively to inhibit and partially to enable gates in the arrays 24 and 25. Channel pulses are fed through the enabled gates to the accumulator 32, where they are added algebraically to the values already in the accumulator 32. Signals from the first array 24 of gates are added at a different time in the PCM frame from the signals from the second array 25 of gates. Immediately before each addition, the accumulator is set in response to values stored in an output register 34 or 35, one of which is provided for each output tone it is desired to produce. Immediately after the addition, the sum from the accumulator is delivered to the register 34 or 35, where it is stored until time for the next addition. In this way, the accumulator 32 is time-shared to produce digital signals representing several composite analog tones, each tone signal being stored in a separate register 34 or 35 during intervals between additions. In cases where only one output tone signal is required, the registers 34 and 35 may be dispensed with, and the single output tone taken from the accumulator 32 directly.

The accumulator 32 includes an up-and-down adder, that is, it adds algebraically, alternately adding and subtracting in accordance with the condition of the ADD-SUBTRACT flip-flop 28 or 29 to which it is connected for any particular addition. With this arrangement, according to the invention, the calculated difference signals produced by the difference synthesizers 20 and 21 need be calculated only for one-quarter wave of the simple tone signals. The gating and the ADD-SUBTRACT flip-flops 28 and 29 are then controlled to read out the difference signals, first in one sequence and one polarity, then in the opposite sequence and opposite polarity (completing the first two quarter waves) then again in the first sequence but opposite polarity, and lastly in the opposite sequence and the first polarity. Thus, the phase control flip-flops 26 and 27 change their conditions each time their respective counters 22 and 23 complete a full counting cycle, and the ADD-SUBTRACT flip-flops 28 and 29 change their conditions following every second complete counting cycle of their respective counters 22 and 23.

For convenience, and to simplify the circuitry and reduce the number of components required, the signals produced by the synthesizers 20 and 21 may depart substantially from the exact calculated values, as in the illustrated circuit. Even with these variations, the signals conform closely enough to the idealized values to satisfy standard telephone service requirements. If closer approximations are required, it is only necessary to increase the number of gates in the arrays 24 and 25, and, in some cases, to set up a faster sampling rate than the frame rate of the PCM system.

As shown in FIGS. 2A and 2B, the counters 22 and 23 are simple step counters of conventional type. The counter 22, for example, includes a series of three flip-flops 43, 44, and 45, which are stepped in response to the framing pulse of the PCM system applied at an input terminal 46.

Calculations show that the nominal 660 hz. sine wave may be adequately reconstituted by integrating a series of 12 successive signals time-spaced at the standard 8,000 hz. frame rate, and representing values of 0, 4, 10, 14, 10, 4, 0, −4, −10, −14, −10, and −4, respectively. These signals are produced by the accumulator 32 in response to difference signals fed to it from the gates in the array 24. At the beginning, the accumulator 32 is set at zero, and only the first flip-flop 43 of the counter 22 is marked in response to the first framing pulse, thereby partially enabling the first one of the gates 40 in the array, all of the other gates being inhibited. When the channel pulse appears at the terminal 47, it is fed through the first gate 40, and through a common OR gate 48 to cause the accumulator 32 to add the decimal value 4 (binary 100) to the zero already in it. After the second framing pulse, the second flip-flop 44 in the counter is marked, and the first two of the gates 40 are partially enabled by the counter, so that in response to the next channel pulse the accumulator 32 adds the decimal value 6 (binary 110) resulting in a sum of 10. After the third framing pulse, only the third flip-flop 45 of the counter is marked, enabling only the third one of the gates 40 to indicate an addition of 4 (binary 100) to produce a total of 14 at the output of the accumulator 32. After the fourth framing pulse, the phase flip-flop 26 and the ADD-SUBTRACT flip-flop 28 are marked, and the first flip-flop 43 in the counter. The accumulator, therefore, subtracts 4 in response to the next channel pulse in the following frame, leaving a net value of 10. During the next succeeding frames, the difference values of 6, 4, 4, 6, and 4 are subtracted, whereupon the ADD-SUBTRACT flip-flop 28 reverts to its unmarked condition to instruct the accumulator 32 to add again for the next two complete counting cycles of the counter 22. The simple tone signal of 666 hz. is thus synthesized directly in digital form, without actually encoding an analog signal.

As another example, the second difference synthesizer 21 is arranged to produce difference signals to generate the binary counterpart of a 400 hz. simple tone signal. The counter 23 includes five serially connected flip-flops 51, 52, 53, 54, and 55, respectively, which, in conjunction with the phase control flip-flop 27, selectively enable and inhibit the gates 41 to produce five time-spaced difference singals for each quarter cycle of the 400 hz. simple tone, according to the following sequence.

| | Difference | Algebraic Sum |
|---|---|---|
| | ( 10 | 10 |
| | ( 10 | 20 |
| 1st quarter wave | ( 2 | 22 |
| | ( 2 | 24 |
| | ( 2 | 26 |
| | ( 0 | 26 |
| | ( 0 | 26 |
| 2nd quarter wave | ( −2 | 24 |
| | ( −8 | 16 |
| | ( −8 | 8 |
| | ( −10 | −2 |
| | ( −10 | −12 |
| 3rd quarter wave | ( −2 | −14 |
| | ( −2 | −16 |
| | ( −2 | −18 |
| | ( 0 | −18 |
| | ( 0 | −18 |
| 4th quarter wave | ( 2 | −16 |
| | ( 8 | −8 |
| | ( 8 | 0 |

The gates 41 are connected in two sub-arrays, one ganged to feed a binary 1,000 signal to the accumulator through the OR gate 60, and the second to feed a binary 10 signal to the accumulator through the OR gate 49. The phase control flip-flop 27 changes its condition at the end of each quarter wave of the 400 hz. tone to be synthesized, as marked by the completion of one full counting cycle of the counter 23. The ADD-SUBTRACT flip-flop 29 changes its condition in response to setting of the phase flip-flop 27 after every two complete counting cycles of the counter 23, and its output signal is fed through the gate 62 and the OR gate 64 to cause the accumulator selectively to add or subtract as required for proper synthesis.

The accumulator 32 alternately adds and subtracts. Disregarding the initial sequence, it first adds for two full counting cycles of the counter 23, then subtracts for two, so that, with respect to the sine wave representation of the simple 400 hz. tone, the accumulator adds through two quarter cycles, from a negative peak to the following positive peak of the wave, then subtracts from the positive peak to the following negative peak.

The counters are preferably reset periodically by reset pulses applied at auxiliary terminals 65 and 66, respectively, to ensure against drift.

The accumulator 32 and its associated logic as shown in FIGS. 3A–3C includes a seven bit binary adder of conventional form, and need be described only briefly herein. It includes seven individual binary adders, 71, 72, 73, 74, 75, 76, and 77, the second, third, and fourth of which are connected to the arithmetic input terminals 81, 82, and 83 (FIG. 3B) to accept signals from the OR gates 48, 49, and 60 (FIG. 2B). The output signals from the accumulator 32 are fed through output gates 90 to the registers 34 and 35 in accordance with the timing system chosen. Timing of operation of the accumulator 32 and steering of the signals between the accumulator 32 and the registers 34 are controlled in response to channel pulses from the PCM system, which are applied to input terminals 92, 93, 94, 95, 96, 97, 98, and 99, respectively (FIG. 3A) and appropriately gated through an array of gates 100 selectively to inhibit and enable different ones of the output gates 90 and input gates 100. Signals from the registers 34 and 35 are delivered to auxiliary input terminals 102, 103, 104, 105, 106, 107, and 108, respectively, and reach the adders 71–77 through flip-flops 111, 112, 113, 114, 115, 116, and 117. The outputs of the ADD-SUBTRACT flip-flops 28 and 29 appear at the control input terminal 120 (lower left corner of FIG. 3A), which is connected to the output of the OR gate 64 (FIG. 2B).

Periodically, at least once during each frame of the PCM system, the difference signals to be added are fed to the accumulator 32 by application of channel pulses to the arrays 24 and 25 of gates. The output of the accumulator 32 may be fed to any desired utilization circuit. Preferably, however, because it is usually desired to generate several different composite tone signals, the accumulator is time-shared, and registers 34 and 35 are provided to store the output tone signals during the intervals between additions. According to this arrangement, one time slot, called a bit slot, is preferably used to transfer the information from the desired one of the registers 34 and 35 to the accumulator 32. The next bit slot is used to drive the accumulator, that is, to feed the signals from the difference synthesizers 20 and 21 to the accumulator, and a third bit slot is used to return the updated signals to the register.

Thus, when used with a PCM system having 193 bit slots per frame, the accumulator can accept up to 64 different sets of synthesizing signals. There may be up to 64 difference synthesizers 20 and 21, each arranged to produce signals for synthesizing a different simple tone. In this case, each simple tone could be fed into only one register, because each set of difference signals could be fed to the accumulator 32 only once in each frame. The actual limit then to the number of simple tones available is reduced from the maximum of 64 by the number of register duplications. For example, if one of the simple tones is fed to two registers, the number of simple tones must be reduced by one.

The foregoing is on the assumption that the regular timing pulses present in the conventional PCM system are used for clocking the tone synthesizer, which is not a limitation in the practice of the invention. Separate clocking may be provided at any desired rate in accordance with the designer's choice and system requirements. It is only necessary to synchronize matters so that output signals are not required from the registers 34 and 35 during the three bit intervals used for adding and transferring information between the registers 34 and 35 and the accumulator 32.

The registers 34 and 35 as shown in FIGS. 4A and 4B are of conventional construction, each consisting of a set of seven flip-flops 130 and 131, respectively, with the appropriate input and output terminals and gates. The inputs from the adders are taken through OR gates 132 and 133, and output channel selection is controlled by channel pules, which are fed through OR gates 134 and 136, respectively. The output signals from the registers are delivered through a common array of OR gates 138 either to the accumulator 32 or to any other desired utilization circuit. The registers are timed by a clock signal applied to an input terminal 140, and steering signals identifying the particular register connected at any given moment to the output OR gates 138 are developed at auxiliary steering output terminals 142 and 144.

What is claimed is:

1. An electrical tone synthesizer for generating digital signals corresponding to an analog tone signal comprising:

a. a multi-stage binary up-and-down accumulator, b. means for producing predetermined binary signals representing the calculated differences between successive time-spaced samples of the analog tone signal without reference to an analog signal, and c. means for applying binary signals produced by said producing means to said accumulator for up-and-down adding at periodic intervals, whereby the output of said accumulator consists of binary signals indicative of the quantum values of the successive calculated samples.

2. A tone synthesizer according to claim 1 in which said binary signal producing means includes means to produce difference signals in binary form indicating value differences between successive samples taken over only one half wave interval of a simple analog tone signal representable as a sine wave, and also includes means for reversing the algebraic sign of addition of said accumulator at the end of each half wave of the simple analog tone signal.

3. A tone synthesizer according to claim 1 wherein said producing means comprise an encoder and a counter connected to set said encoder in response to received timing signals such as framing pulses derived from a pulse code modulated digital signalling system.

4. An electrical tone synthesizer for generating digital signals corresponding to an analog signal representable as the sum of a plurality of simple sine waves comprising, a. a multi-stage binary up-and-down accumulator, b. means for producing predetermined binary signals representing the calculated differences between successive time-spaced samples of each simple sine wave component of the analog signal without reference to an analog signal, and c. means for applying the signals produced by said producing means to said accumulator for up-and-down adding at periodic intervals, whereby the output of said accumulator consists of binary signals indicative of the quantum values of the sum of the calculated values of all the simple sine wave components.

5. An electrical tone synthesizer for generating digital signals corresponding to preselected analog signals comprising:

a. a multi-stage up-and-down accumulator, b. means for producing predetermined binary signals representing the calculated differences between successive time-spaced samples of each of the analog signals without reference to an analog signal, c. means for applying signals produced by said producing means to said accumulator selectively on a time-shared basis for up-and-down adding at periodic intervals, separately adding the predetermined binary signals for each one of the analog signals, d. registers equal in number to the preselected analog signals, and e. gate means connecting said registers to said accumulator in predetermined time-spaced order relative to the operation of said applying means so that the outputs of said registers are respectively indicative of the quantum values of the successive calculated samples of the different analog signals.

6. An electrical tone synthesizer for generating digital signals corresponding to analog signals that are representable as the sums of simple sine waves comprising:

a. means for producing predetermined space divided binary signals indicative of the differences in value between successive time spaced samples of each of the simple sine waves without reference to an analog signal, b. an accumulator, c. means for applying signals produced by said producing means to said accumulator in predetermined sequence, d. registers equal in number to the digital output signals to be generated, and e. means connecting the output of said accumulator to said registers and transferring signals selectively back and forth between said accumulator and said registers in predetermined timed relationship to the operation of said applying means to cause said accumulator to add the respective components of the output signals on a time-shared basis and to store the sums in the respective registers during intervals between additions.

7. An electrical tone synthesizer according to claim 6 arranged for operation in a pulse code modulated, time division multiplex signalling system of the kind having a repetitive time frame including a predetermined number of individual signal intervals, said synthesizer including synchronizing means to operate it synchronously with the frame and individual signal intervals of the signalling system.

8. An electrical tone synthesizer for generating digital signals corresponding to an analog tone signal for pulse code modulated systems of the type that transmit a plurality of sequential channels of information in recurring frames, said synthesizer comprising:

a. a multistage binary up-and-down accumulator, b. counter circuit means for counting frames, c. decoder means responsive to the output of the final stage of said counter circuit means for counting frames and producing phase signals indicative of the relationship between the recurrent frames and the instantaneous phase of the analog signals that are to be represented by digital signals, d. encoder means including an encoder for each analog signal that is to be represented, e. said counter means and said decoder means being connected to set said encoder means so that its output consists of predetermined binary signals representing the calculated differences between successive time spaced samples of the analog signal, and f. means for applying the output signals of said encoder means to said for applying the output signals of said encoder means to said accumulator of up-and-down adding at periodic intervals, whereby the output f said accumulator consists of binary signals indicative of the quantum values of the successive calculated samples.

* * * * *

UNITED STATES PATENT AND TRADEMARK OFFICE
CERTIFICATE OF CORRECTION

PATENT NO. : 3,742,197
DATED : June 26, 1973
INVENTOR(S) : Uwe A. Pommerening

It is certified that error appears in the above-identified patent and that said Letters Patent are hereby corrected as shown below:

| | |
|---|---|
| In The Abstract: | Add the following paragraph --- The accumulator may be time-shared to produce a large number of output signals, each of which is stored in its own register during intervals between successive adding and subtracting operations.--- |
| Col. 4, line 68 | "singals" should read ---signals---. |
| Col. 8, line 54 | Delete "for applying the output signals" |
| line 55 | Delete "of said encoder means to said" |
| line 55 | "of" (second occurrence) should |

Signed and Sealed this

*tenth* Day of *February 1976*

[SEAL]

*Attest:*

RUTH C. MASON
*Attesting Officer*

C. MARSHALL DANN
*Commissioner of Patents and Trademarks*